Dec. 27, 1949    A. K. WATCHER    2,492,545
MICROMETER ADJUSTING DIAL
Filed Oct. 18, 1946
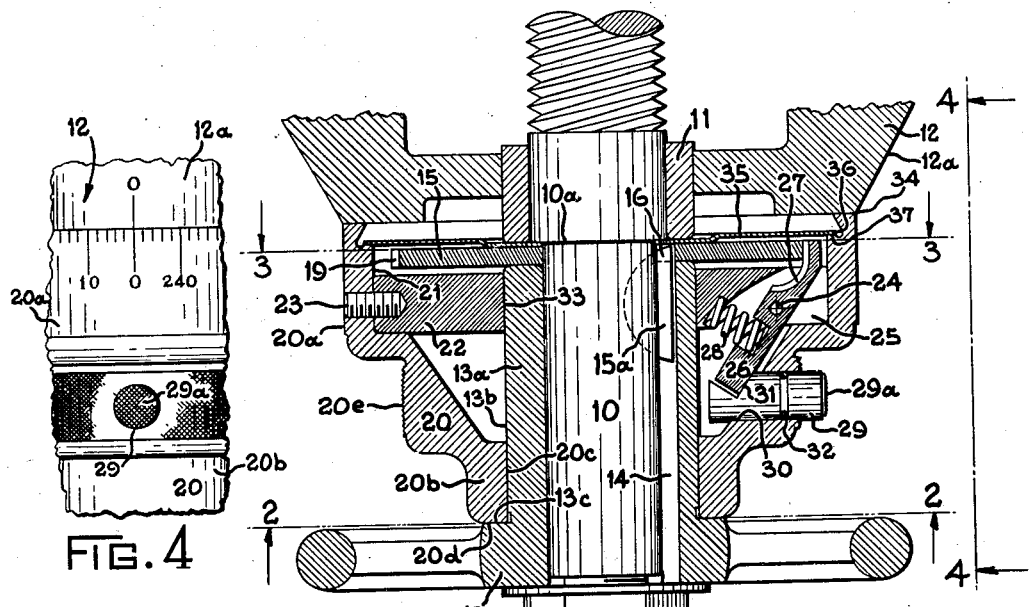
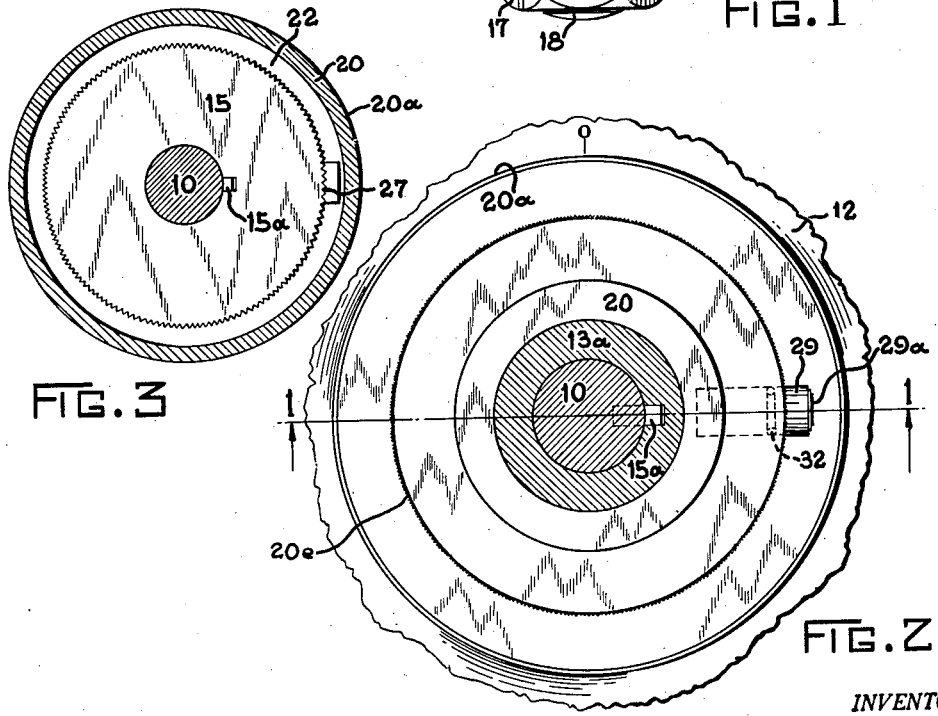
INVENTOR.
ALBERT KEITH WATCHER.
BY
Toulmin & Toulmin
ATTORNEYS Patented Dec. 27, 1949

2,492,545

UNITED STATES PATENT OFFICE 2,492,545

MICROMETER ADJUSTING DIAL

Albert Keith Watcher, Kenwood, Ohio, assignor to The Cleveland Automatic Machine Company, Norwood, Ohio, a corporation of Ohio Application October 18, 1946, Serial No. 704,100

3 Claims. (Cl. 116—124)

This invention pertains to adjustable dial indicating mechanism for machine tools and is more particularly directed to an improved adjustable precision indicating mechanism for showing accurately the relative position of a pair of movable members of a machine tool or the like.

In machine tools, it is customary to indicate the relative position of a tool slide or work table by a graduated dial rotated by the feed or adjusting screw of the particular machine member to be moved to a predetermined position. In one form of this arrangement, it has been customary to adjustably mount the indicating dial for rotation on the feed screw and to have an indicating zero mark on the machine tool frame cooperating with graduations on the dial for showing the amount of rotation of the feed screw and thereby the amount of movement of the particular slide or work table actuated by the rotation of the screw. Usually, the graduated dial was journaled on the screw, or hand wheel hub fixed to the screw, and had a friction tightening device for holding the graduated dial in position on the screw relative to the zero mark for effecting the desired setting of the machine member.

In modern machine tools, however, the feed screw is not only actuated at feed rates but is invariably actuated at high rapid traverse rates for initial positioning or withdrawal of the work and tool in setting up and at the completion of the cutting operation. The imposition of the rapid traverse suddenly to the screw or the withdrawal of this rapid movement and return to feed causes certain inertial reactions in the friction held graduated dial which causes the dial to slip or move its position from that originally set and therefore result in error in accuracy of positioning.

In order to overcome this problem, there has been provided an adjustable indicating dial utilizing a claw clutch or positive serrated tooth-type clutch for connecting the graduated dial to the feed screw. In such devices, however, there have been certain fundamental defects which have not rendered their use satisfactory. In particular, such serrated tooth-type clutch dials must be moved axially relative to the feed screw and machine frame for repositioning the dial to a new location. There is also required a compression spring necessary to hold the dial in engagement with the serrated tooth disc fixed to the feed screw or other member rotatable to actuate the machine member. This axial movement for adjustment of the dial together with the opposition of a resilient spring to normally hold the teeth in engagement makes it difficult to accurately and easily set the dial to the desired position. This is due to the fact that the operator must exert both a radial outward pulling movement on the adjusting dial while at the same time he is trying to rotate it to the desired selected position with the result that he cannot control easily and accurately the exact graduated line setting at which he wishes to position the dial.

The arrangement of the axially sliding dial for adjustment is also defective in that it is impossible to seal up the serrated tooth clutch mechanism from the coolant water and chips coming from the cutting tool and work piece on the machine member with the result that the dial soon becomes fouled with foreign matter and becomes difficult to move not only axially but rotatably to the desired adjusting position.

It is therefore one of applicant's objects to provide a positive serrated tooth adjustable graduated dial which may be rotated to any desired position of adjustment without any axial movement of the dial relative to the actuating screw upon which it is mounted or relative to the associate portion of the machine frame.

It is also an object of this invention to provide a means whereby the positive jaw clutch release is effected by pinching the dial between the thumb and fingers so that there will be no unbalanced pressure of the hand on the dial while making the relative adjustment thereof with respect to the machine frame and actuating screw.

Still another object of this invention is to provide an improved, positive jaw, adjustable micrometer dial which is totally enclosed at all times so as to seal in lubricant and seal out foreign matter and coolant from destroying the accuracy and operativeness of the dial.

A still further object of this invention is to provide a positive serrated tooth clutch micrometer setting dial which may be released and rotated to any desired position of adjustment without moving the dial relatively axially of the feed screw to which it is associated.

And it is also an object to construct a positive serrated tooth clutch micrometer setting dial which is inexpensive to manufacture and free from the harmful effects of coolant and chips from the work and tool of the machine so as to maintain its maximum efficiency and accuracy at all times.

Further features and advantages of this invention will appear from a detailed description of the drawings in which:

Figure 1 is a diametral section through a dial indicating mechanism incorporating the features of applicant's invention, indicated on the line 1—1 of Figure 2.

Figure 2 is an outside end view of the dial indicated by the line 2—2 in Figure 1.

Figure 3 is a section on the line 3—3 of Figure 1, particularly showing the serrated tooth disc and cooperating clutch jaw.

Figure 4 is a fragmentary view indicated by the line 4—4 in Figure 1, showing the dial graduations.

Ordinarily, in machine tools the feed screw or actuating shaft 10 is supported on suitable journal means 11 and thrust bearing means (not shown) against axial movement in the machine frame 12 and is connected by the usual means (not shown) for actuating a machine member such as a cross slide or work table relative to the machine frame 12. Fixed to the screw of shaft 10 is a hand wheel 13 having a key way 14 cooperating with a key 15a.

In this particular dial structure, there is utilized a clutch disc 15 having a key way 16 also cooperating with the key 15a so as to be positively rotated with the shaft 10. The hand wheel 13 has its hub 13a and the disc 15 securely locked against the shoulder 10a of the screw 10 by a nut 17 mounted on the threaded end 18 of the shaft 10.

The clutch disc 15 is provided with a series of fine serrations or clutch teeth 19 which have a pitch equal to one-thousandth of an inch of relative machine member movement effected by rotation of the screw 10. In other words, the angular rotation of the shaft 10 the distance of one pitch between the teeth 19, for example, effects a one-thousandth movement of the machine member, any other value, of course, being selectable. For instance, a tenth of a thousandth change in machine member position where high degree of accuracy of positioning are required may be used or a two-thousandth movement of the machine member in cases where a cross slide of a lathe is to be adjusted so as to indicate directly the diameter resulting from the tool slide adjustment.

Surrounding the disc 15 is the adjustable graduated dial 20 having a peripheral portion 20a upon which is formed the graduations which cooperate with a zero mark on the surface 12a of the machine frame. The hub portion 20b of the graduated dial 20 has a bearing portion 20c journaled on the surface 13b of the hub 13a of the hand wheel 13 and has a radially extending face 20d which engages the face 13c of the hand wheel 13 in a fluid and dust-tight sealing relationship. Inside of the dial 20 is formed a bore 21 in which nicely fits the collar member 22 which is rigidly held in place therein by a suitable screw 23. Mounted on a pivot pin 24 in a radially extending slot 25 in the collar member 22 is the clutch pawl or serrated clutch jaw 26 having a series of serrated teeth 27, Figure 3, of the same pitch and nicely meshing with the teeth 19 in the periphery of the disc 15. A compression spring 28 abutting against the collar 22 and the member 26 normally urges the serrated teeth 27 of the member 26 into engagement with the teeth 19 of the disc 15 so that rotation of the screw 10 and hand wheel 13 causes the disc 19 to rotate the graduated collar 20 therewith.

In order to release the dial 20 for relative rotatable adjustment with respect to the screw 10 and hand wheel 13, there is provided a release plunger 29 carried in a radially extending bore 30 in the dial 20 and having an abutment surface 31 engaging the outer end of the clutch 26 so that when the plunger 29 is pressed radially inwardly it will compress the spring 28 and release the clutch teeth 27 from the peripheral teeth 19 of the clutch disc 15. When so held depressed radially inwardly, the plunger 29 allows the dial 20 to be rotated to any relative position for setting its graduations on the surface 23 relative to the indicating mark 12a on the machine frame 12 and that after this exact setting has been done, the plunger is merely released without any further movement of the dial to effect a positive engagement of the dial for rotation with the screw 10 and hand wheel 13. It will be noted that a seal 32 is provided between the plunger 29 and the bore 30 to keep out all foreign matter from getting into the interior portion of the apparatus just described. It will furthermore be noted that in effecting release of the dial for rotation relative to the screw that the operator effects a pinching action between the head 29a of the plunger 29 and the diametrically opposite knurled portion 20e of the dial 20 so that there is no exertion of force on the dial itself which in any way interferes with the actual rotary setting motion to be accomplished with the dial. In other words, the operator does not have to hold the dial against opposition in one direction, axially of the screw, while rotating the dial by another force acting perpendicular thereto, but rather the release force is perfectly balanced between the points 20a and 29a during the actual setting of the dial so that a nicety of control by the operator in positioning the dial is effected.

The inner portion of the dial is supported through the collar member 22 by its bore 33 which is journaled on the surface 13b of the hub 13 of the hand wheel 13. The entire rear portion of the mechanism is sealed from any foreign matter which might get into the apparatus just described through the gap 34 between the inner face of the dial 20 and the machine frame 12. This is closed off by means of a thin spring disc or plate 35 which nicely fits around the shaft 10 against its shoulder 10a and is locked in position by the nut 17 at the same time the hand wheel and clutch disc 15 are clamped to the shaft 10. The outer peripheral edge 36 of the disc 35 is spring-seated to constantly engage in dust and liquid-tight relationship the surface 37 formed on the inner portion of the dial 20.

There has thus been provided an improved positive positionable indicating dial which may be set by rotation alone to any desired rigid fixed position relative to the rotatable hand wheel and screw of a machine tool. It is also to be noted that the forces applied for releasing and reengaging the dial in selected position are perfectly balanced by a pinching action extending diametrically across the dial so that the releasing motion in no way interferes with the proper manipulation of the dial. It is to be further noted that the dial provides a totally enclosed mechanism free from coolant and cutting chips of the machine tool which thereby renders the apparatus highly accurate and efficient in operation.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a dial indicating mechanism for a machine tool having a frame, an actuating shaft on said frame for moving a machine member, a graduated dial journaled against axial movement on said shaft, graduations on said dial cooperating with a zero mark on said machine frame, a member fixed to said shaft having a series of serrated teeth whose pitch equals the pitch of the graduations formed on said dial, a releasable clutch jaw means engageable with said serrations for positively locking said dial for rotation with said shaft, and means including a radial disposed release plunger projecting through the periphery of said dial movable radially inwardly to release said clutch jaw means.

2. In a machine tool indicating dial for showing rotative positions of a feed screw of said machine tool, a rotatable dial member, graduations on said member associated with a zero mark on the machine structure, positive jaw clutch means having a pitch of the jaws equal to the pitch of the graduations on said dial, a releasable serrated gripping member cooperating with said clutch teeth, and a release push button disposed for radial movement in said collar and projecting outwardly from the periphery thereof, and a knurled peripheral portion on said dial associated with said push button to facilitate rotating said dial to desired adjusted positions when said push button is depressed radially inwardly by diametral pinching action of said push button in gripping the knurled portion of said knob between the thumb and fingers of the operator.

3. In a dial mechanism for a machine tool having a feed screw journaled in the frame of said machine, a hand wheel fixed to said feed screw, a graduated dial journaled on said shaft and confined axially against movement thereon between said hand wheel and said frame, a clutching disc rigidly fixed to said shaft, fine serrations formed on the periphery of said disc having a pitch equal to the graduations formed on the periphery of said dial, a latch pawl pivotally mounted on said dial for swinging movement in a radial plane to and from engagement with the peripheral serrations in said clutch disc, a plunger disposed for radial movement diametrically of said dial, engaging said pawl when pressed inwardly towards the axis of said screw, and resilient means for normally urging said pawl into engagement with said clutch to lock said dial in rotative driven relationship with said screw.

ALBERT KEITH WATCHER.

REFERENCES CITED

The following references are of record in the file of this patent:

UNITED STATES PATENTS

| Number | Name | Date |
|---|---|---|
| 995,726 | Runge | June 20, 1911 |
| 1,335,980 | Mills | Apr. 6, 1920 |
| 1,826,482 | Rummel, Jr. | Oct. 6, 1931 |
| 2,000,448 | Keil | May 7, 1935 |
| 2,257,291 | Bemis | Sept. 30, 1941 |
| 2,336,163 | Bullard et al. | Dec. 7, 1943 |

FOREIGN PATENTS

| Number | Country | Date |
|---|---|---|
| 20,485 | Great Britain | Sept. 29, 1908 |